US010691134B2

(12) United States Patent
Schulze

(10) Patent No.: US 10,691,134 B2
(45) Date of Patent: Jun. 23, 2020

(54) LOCATION AND POSITION DETECTION FOR A CONVEYING APPARATUS

(71) Applicant: EISENMANN SE, Boeblingen (DE)

(72) Inventor: Herbert Schulze, Aidlingen (DE)

(73) Assignee: EISENMANN SE, Böblingen (DE)

(*) Notice: Subject to any disclaimer, the term of this patent is extended or adjusted under 35 U.S.C. 154(b) by 0 days.

(21) Appl. No.: 15/564,814

(22) PCT Filed: Apr. 8, 2016

(86) PCT No.: PCT/EP2016/000578
§ 371 (c)(1),
(2) Date: Oct. 6, 2017

(87) PCT Pub. No.: WO2016/162124
PCT Pub. Date: Oct. 13, 2016

(65) Prior Publication Data
US 2018/0113466 A1    Apr. 26, 2018

(30) Foreign Application Priority Data

Apr. 9, 2015  (DE) ............... 10 2015 004 330

(51) Int. Cl.
*B65G 7/04*   (2006.01)
*G01B 11/14*  (2006.01)
(Continued)

(52) U.S. Cl.
CPC .............. *G05D 1/0234* (2013.01); *B65G 7/04* (2013.01); *G01B 11/14* (2013.01); *G01B 11/26* (2013.01);
(Continued)

(58) Field of Classification Search
CPC ............ B65G 7/04; G01B 11/24; G01B 11/26
(Continued)

(56) References Cited

U.S. PATENT DOCUMENTS 6,732,024 B2 * 5/2004 Wilhelm Rekow . A01B 69/008
340/901
7,629,899 B2 * 12/2009 Breed ................ B60N 2/2863
340/435
(Continued)

FOREIGN PATENT DOCUMENTS

CN   203 475 067 U   3/2014
DE   102 40 227 A1   3/2004
(Continued)

*Primary Examiner* — Douglas A Hess
(74) *Attorney, Agent, or Firm* — Schroeder Intellectual Property Law Group, LLC

(57) ABSTRACT

A conveying apparatus for conveying laden or unladen load carriers, having a first conveying unit and a second conveying unit, wherein each conveying unit can be displaced on ground-level rollers and the first and the second conveying units can be moved relative to one another and independently of one another. A device is provided for determining the position and the location of the first conveying unit relative to the second conveying unit, the device having a camera, which is arranged on the first conveying unit, and having a feature arranged on the second conveying unit, or a combination of features arranged on the second conveying unit, wherein the feature or the combination of features has an extent in the direction of travel and an extent perpendicular to the direction of travel, wherein the extents can be sensed by the camera. A conveying unit for a conveying apparatus is also provided.

17 Claims, 8 Drawing Sheets

(51) Int. Cl.
  *G01B 11/26* (2006.01)
  *G05D 1/02* (2020.01)
(52) U.S. Cl.
  CPC ... *G05D 1/0293* (2013.01); *G05D 2201/0216* (2013.01)
(58) Field of Classification Search
  USPC ..... 701/28, 36, 49, 300; 340/902; 198/464.1
  See application file for complete search history.

(56) References Cited

U.S. PATENT DOCUMENTS

| | | | | |
|---|---|---|---|---|
| 8,099,218 | B2* | 1/2012 | Glee | E01C 19/004 |
| | | | | 106/271 |
| 9,135,511 | B2* | 9/2015 | Hayakawa | G06K 9/00805 |
| 9,253,753 | B2* | 2/2016 | Rubin | H04W 72/005 |
| 9,332,692 | B2* | 5/2016 | Krause | A01D 57/00 |
| 9,497,898 | B2* | 11/2016 | Dillon | A01D 90/10 |
| 9,526,199 | B2* | 12/2016 | Matsuzaki | A01B 69/00 |
| 9,643,789 | B2* | 5/2017 | Teichrob | B65G 41/001 |
| 9,861,040 | B2* | 1/2018 | Bonefas | A01D 43/073 |
| 10,081,357 | B2* | 9/2018 | Saigusa | G08G 1/096791 |
| 10,096,067 | B1* | 10/2018 | Slusar | G06Q 40/08 |
| 2011/0125312 | A1 | 5/2011 | D'Andrea et al. | |
| 2011/0256800 | A1 | 10/2011 | Jennings et al. | |
| 2015/0025754 | A1 | 1/2015 | Krause et al. | |

FOREIGN PATENT DOCUMENTS

| | | |
|---|---|---|
| DE | 10 2012 214 579 A1 | 2/2014 |
| DE | 10 2013 001 079 A1 | 8/2014 |
| DE | 11 2013 000 939 T5 | 11/2014 |
| EP | 2 827 213 A2 | 1/2015 |
| WO | 2009/043474 A2 | 4/2009 |
| WO | 2011/123656 A1 | 10/2011 |
| WO | 2013/184177 A2 | 12/2013 |
| WO | 2014/026843 A2 | 2/2014 |
| WO | 2014/114430 A1 | 7/2014 |

\* cited by examiner

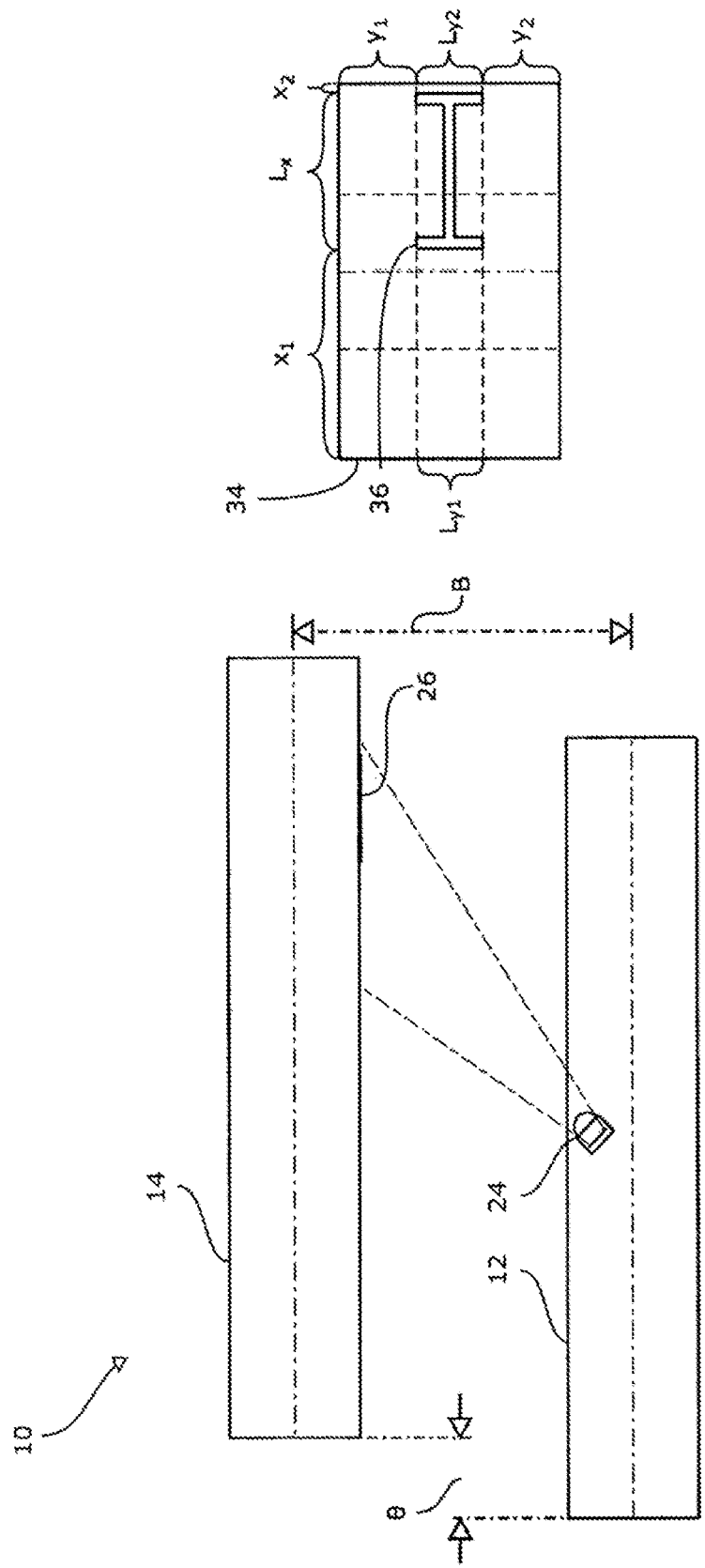

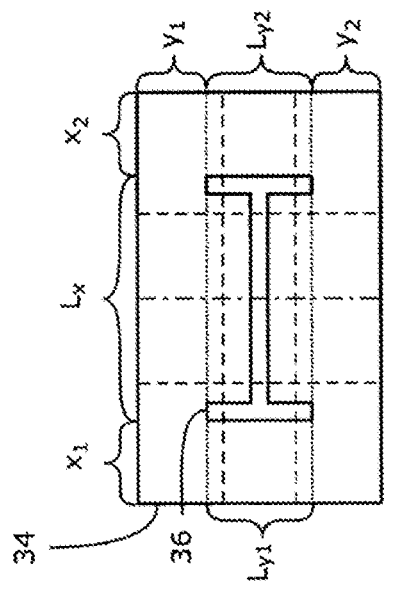
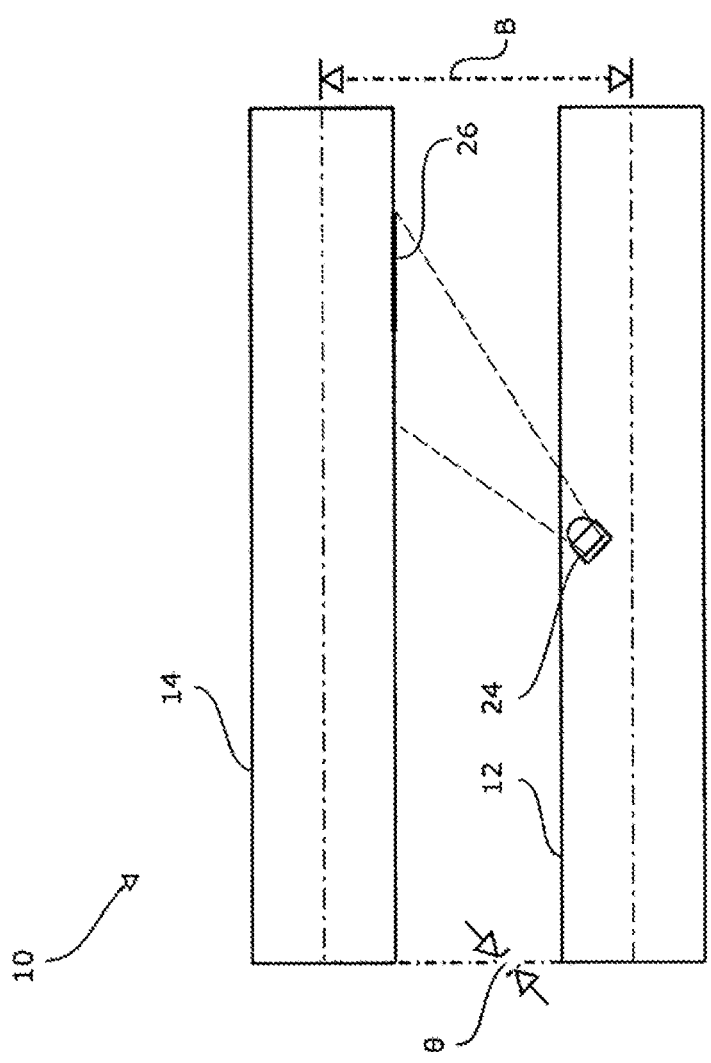
Figure 4B
Figure 4A

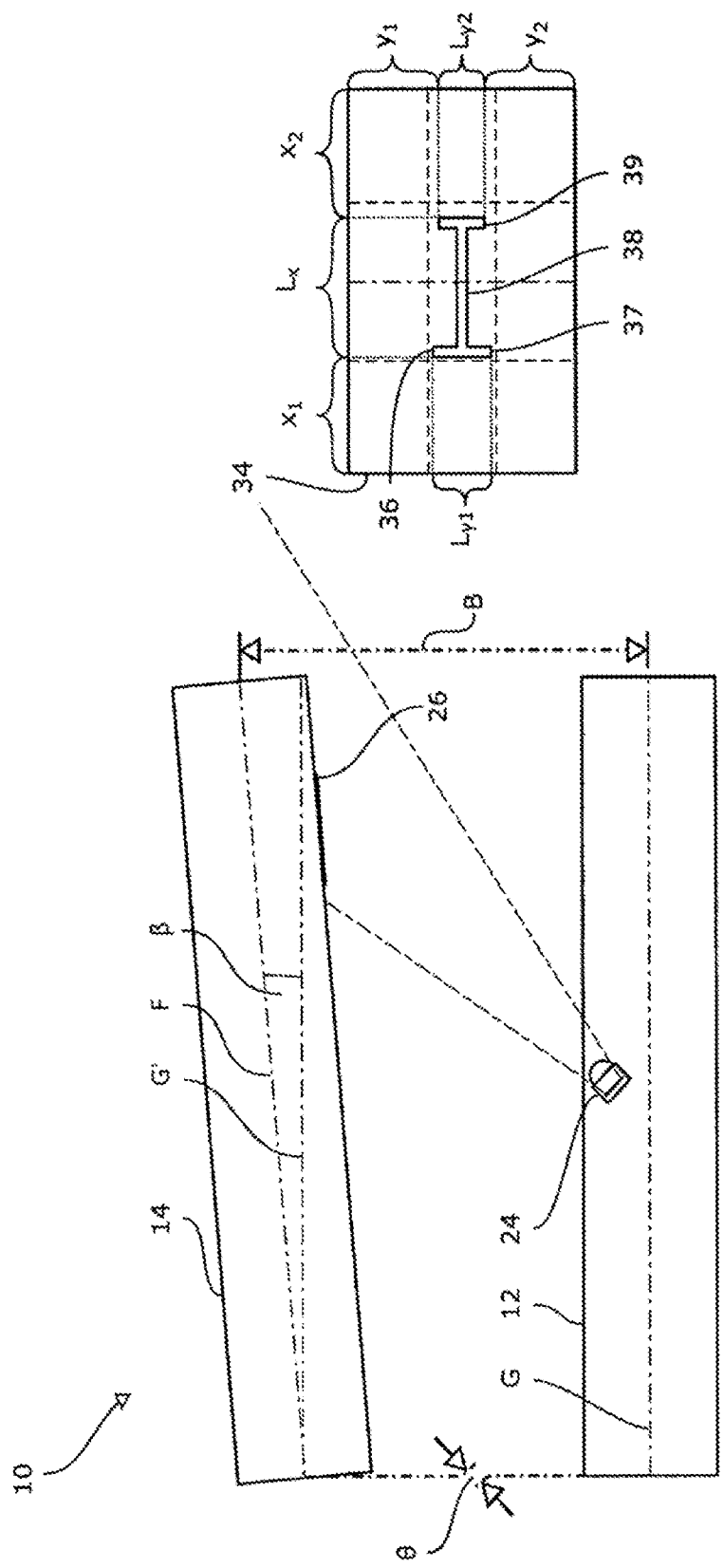

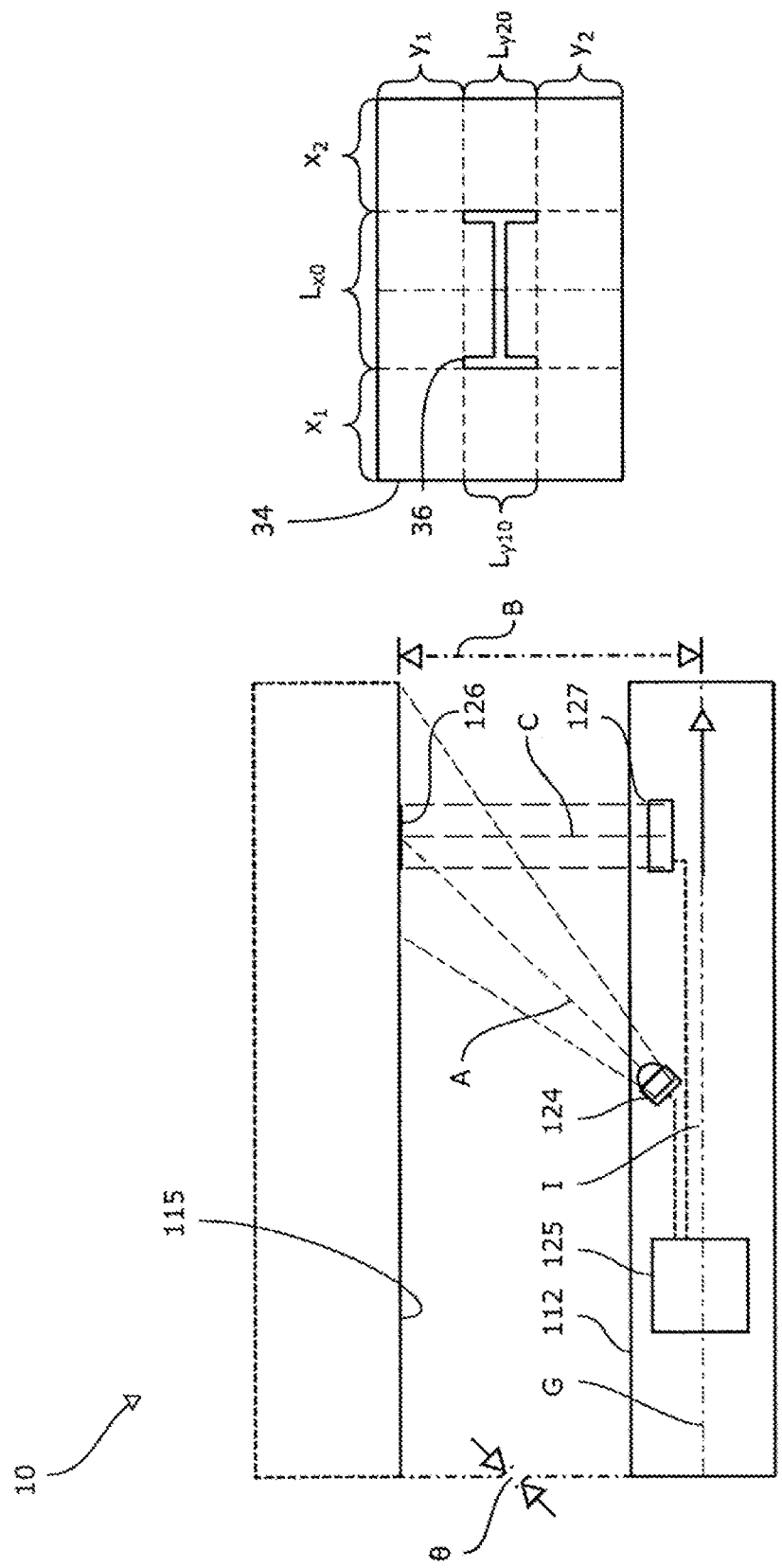

LOCATION AND POSITION DETECTION FOR A CONVEYING APPARATUS

RELATED APPLICATIONS

This application is a national phase of International Patent Application No. PCT/EP2016/000578 filed Apr. 8, 2016, which claims the filing benefit of German Patent Application No. 10 2015 004 330.7 filed Apr. 9, 2015, the contents of both of which are incorporated herein by reference.

FIELD OF THE INVENTION

The invention relates to a conveying apparatus for conveying laden or unladen load carriers, having a first conveying unit and a second conveying unit, wherein each conveying unit is able to be displaced on ground-level rollers and the first and the second conveying units can be moved relative to one another and independently of one another.

BACKGROUND OF THE INVENTION

A conveying apparatus of this type is known per se for example from DE 10 2007 046 868 A1. In the document mentioned, in each case two conveying units form a conveying apparatus in the manner of a conveying skid. The two conveying skids are designed to convey load carriers in the form of pallets, in particular of what are known as Europallets. To this end, the two conveying skids, in the form of a pair of conveying skids, can maneuver to below a pallet, raise it, convey it in its raised state to a site, and set it down again.

To coordinate the joint movement of the two conveying units, a knowledge of the relative location of the two conveying units and in particular of any existing or resulting angular misalignments is indispensable. To ascertain the exact relative position, complicated optical systems, such as for example laser measurement systems, are used for comparable tasks. Said systems reliably provide the desired data with the necessary accuracy. However, owing to the required accuracy, such systems are complicated and expensive. In addition, optical measurement systems of this type are prone to errors. If used in or on conveying skids, which are moved, for example, underneath Euro-pallets, contamination or damage in the form of scratches easily occurs, which can quickly result in a high error rate and thus a malfunction of the system.

SUMMARY OF THE INVENTION

It is an object of the invention to specify a conveying apparatus for conveying laden or unladen load carriers, which avoids said disadvantages and is in particular cost-effective and robust.

This object may be achieved by way of a conveying unit having ground-level rollers so that the conveying unit is displaceable along a direction of travel and a camera for capturing an image of a feature provided on a surface or of a feature combination, wherein the feature or the feature combination has an extent in the direction of travel and an extent perpendicular to the direction of travel, and the extents are capturable by the camera, and by way of a conveying apparatus having a first conveying unit and a second conveying unit, wherein each conveying unit is displaceable on ground-level rollers, and the first conveying unit and the second conveying unit are movable relative to one another and independently of one another along a respective direction of travel, a device for determining the position and the location of the first conveying unit relative to the second conveying unit, having a camera arranged at the first conveying unit, a feature arranged at the second conveying unit or a feature combination arranged at the second conveying unit, wherein the feature or the feature combination has an extent in the direction of travel and an extent perpendicular to the direction of travel, wherein the extents are capturable by the camera. Further configurations of the invention are specified in additional elements of the invention.

The conveying unit according to the invention is adapted such that it can be used for a conveying apparatus for conveying laden or unladen load carriers. It has ground-level rollers, with the result that the conveying unit is displaceable along a direction of travel. The conveying unit furthermore has a camera for capturing an image of a feature that is provided on a surface or a feature combination. The feature or the feature combination has an extent in the direction of travel and an extent that is perpendicular to the direction of travel. The extents in the direction of travel and perpendicular to the direction of travel are able to be captured by the camera. With knowledge of the actual extents of the feature or the feature combination, it is possible to make statements relating to the relative location and the relative position of the conveying unit for the feature or the feature combination on the basis of the captured feature extents in the direction of travel and perpendicular to the direction of travel. This can be done simply by using a camera that requires no particularly high resolution. The features or the feature combinations can be provided in the environment through which the conveying unit is able to travel. This can be fixed surfaces, such as delimitation walls or guiding walls, or movable objects, such as for example a second conveying unit which travels concomitantly.

In a preferred embodiment, provision may be made for the conveying unit to have a projection apparatus for projecting the feature or the feature combination from the conveying unit onto a surface. The feature or the feature combination can thus be projected onto a surface which is optically accessible to the conveying unit. It is possible using the projection to gather information relating to the relative position and the relative location both at a fixed surface and also, for example, in a concomitantly moving conveying unit at arbitrary times, for example intermittently or continuously.

Provision can in particular be made for the conveying unit to be adapted to ascertain, using the captured image, at least one distance between the conveying unit and the feature or the feature combination, and an angle between the conveying unit and the extent of the feature in the direction of travel. These two variables permit a relative position determination of the conveying unit, which under certain circumstances is already sufficient for the operation of the conveying unit, or may be supplemented, if needed, by further information from other sources.

A conveying apparatus according to the invention for conveying laden or unladen load carriers has a first conveying unit and a second conveying unit. Each of the conveying units is displaceable on ground-level rollers. The first conveying unit is movable relative to the second conveying unit and independently of the second conveying unit. The conveying apparatus has, according to the invention, a device for determining the position and location of the first conveying unit relative to the second conveying unit. The device comprises a camera, which is arranged at the first conveying unit, and a feature, which is arranged at the second conveying unit, or a feature combination, which is arranged at the second conveying unit. The feature or the feature combination have an extent in the direction of travel and an extent perpendicular to the direction of travel. The extents are able to be captured by the camera. Due to the particular design of the feature or the feature combination, the camera can have a simple and robust design. The camera can capture the extent of the feature or the feature combination in the direction of travel and perpendicular to the direction of travel and ascertain the position and the location of the two conveying units relative to one another from the data thus obtained.

Direction of travel is understood to refer to a direction in which a conveying apparatus moves. The conveying direction of the conveying apparatus is obtained from the combination of the directions of travel of the first and of the second conveying unit.

The term "feature" refers to an object which is able to be captured with the camera, i.e. optically. The object can, for example, be visible on the surface, such as by way of a colored surface design, for example by way of a foil, a sticker or a color application, or have a structural equivalent at the conveying unit. The object can be, for example, a light projection, a drawing or a painted area that is located in or on the surface and visible to the camera, an element that is applied on the surface, such as for example a sticker or a sign, or a structure that is located at or in the housing of the conveying unit.

The term "feature combination" is understood to mean a combination of two or more features, which in combination have an extent in the direction of travel and perpendicular to the direction of travel. A feature combination of this type can be, for example, two quasi diagonally arranged points which are offset in the direction of travel and perpendicular to the direction of travel, two circular or elliptical structures, or a rectilinear structure which extends in each case in the direction of travel and perpendicular to the direction of travel. Other configurations than the ones mentioned are, of course, also feasible.

The term "position" is understood to be a specification of the site of a conveying unit in a Cartesian coordinate system. The coordinate system can be, for example, an absolute reference system, or a relative reference system that relates to a conveyer unit. The term "location" is understood to be the orientation of a conveying unit by way of a specification of angular size. The location of a first conveying unit, for example, can be specified with reference to another conveying unit or by using an absolute reference system.

It is possible in this way to determine a dimension of the feature or of the feature combination in the direction of travel and a dimension of the feature or the feature combination perpendicular to the direction of travel on the basis of an image recorded by the camera. The capturability of the dimension both in the direction of travel and perpendicular to the direction of travel permits a distinction to be made between a mere change in distance between the first and the second conveying unit and a change in the location of the first conveying unit relative to the second conveying unit, and consequently permits, for example, exact parallel alignment of the first conveying unit relative to the second conveying unit with simultaneous determination or ascertainment of the distance of the first conveying unit from the second conveying unit. In addition, a relatively simple camera can be used, which permits a cost-effective and at the same time robust configuration.

A preferred embodiment of the conveying apparatus makes provision for the camera and the feature or the feature combination to be arranged at the first conveying unit and the second conveying unit such that a camera axis is aligned with the feature or the feature combination, and for the camera axis to enclose an angle other than 90°, preferably between 70° and 20°, with particular preference of 45°±15°, with the extent of the feature or of the feature combination in the direction of travel. The camera axis is the optical axis of the camera. Consequently, either the feature or the feature combination can be arranged substantially parallel at the second conveying unit and the camera of the first conveying unit can be aligned at an angle to the feature or the feature combination, or the feature or the feature combination is attached at an angle at the second conveying unit and the camera that is attached at the first conveying unit is aligned substantially perpendicularly to the second conveying unit. Other solutions in which both the camera and the feature or the feature combination are arranged at an angle with respect to the respective conveying unit and thus adopt said angular relationship in relation to one another are, of course, also feasible. The angular relationship has the advantage that a change in angle between the feature or the feature combination and the camera results in a comparatively strong change in the extent of the feature or the feature combination in the direction of travel and thus in a great sensitivity with respect to small angle changes.

A particularly preferred embodiment makes provision for the feature or the feature combination to be structural. The term "structural" in this context is understood to mean that the feature is integrated in the structure of the conveying unit, for example in the housing. This has the advantage that the feature or the feature combination remains able to be captured easily by the camera even if the degree of soiling is great or in the case of wear-related deterioration.

In this context, provision may be made for the feature or the feature combination to comprise cutouts, elevations or/and edges, in particular the cutouts can be formed as holes or/and grooves.

Alternatively or additionally, provision may be made for the feature or the feature combination to consist at least partially of light. The light can be producible for example on the surface, such as by way of discrete light-emitting means, such as light-emitting diodes, or by way of a display panel, such as a liquid-crystal display. Alternatively or additionally, the light can be projected onto the surface.

To this end, for example a projection device for projecting the feature or the feature combination from the first conveying unit onto the second conveying unit can be provided in the first conveying unit. It is possible using a projected feature or a projected feature combination to determine at least an angle that is enclosed by the first conveying unit and the second conveying unit, and a distance between the first conveying unit and the second conveying unit. If appropriate, a part of the feature or the feature combination can be structural, and a different part can be projected. Such a combination can not only permit the determination of the distance between the first conveying unit and the second conveying unit, but also the determination of a distance along a common direction of travel of the first conveying unit and the second conveying unit. By way of example, the projected part of the feature or the feature combination can be variable in the case of a change in the relative position of the first conveying unit with respect to the second conveying unit along the direction of travel by way of the structural part of the feature or of the feature combination. This can be, for example, an edge or a step in the housing of the second conveying unit that changes the appearance of the projected part of the feature or of the feature combination if the relative position changes. Alternatively or additionally, surface properties that influence the reflection of the projected part of the feature or of the feature combination can also be provided at the second conveying unit, with the result that the change in the relative position of the first conveying unit to the second conveying unit also causes a change in the reflection of the produced part of the feature or of the feature combination.

In one embodiment, a control apparatus can be provided which is set up to capture the length of the extent of the feature or of the feature combination in the direction of travel and perpendicular to the direction of travel to determine the position and the location of the first conveying unit relative to the second conveying unit. The simultaneous capturing of the extents of the feature or of the feature combination in the direction of travel and perpendicular to the direction of travel offers the possibility of distinguishing between a change in distance between the first conveying unit and the second conveying unit—i.e. a change in the relative position—and a change in the angle between the extent of the feature or the feature combination in the direction of travel and the camera axis—i.e. a change in the relative location—in the case of a change in the extent in the direction of travel. In the case of a change in the distance between the first conveying unit and the second conveying unit, the extent of the feature or of the feature combination in the direction of travel and the extent of the feature or the feature combination perpendicular to the direction of travel change by the same proportion. In the case of a change in the angle, on the other hand, the extent in the direction of travel changes, while for different sections of the feature or of the feature combination along the direction of travel a different change occurs with respect to the extent perpendicular to the direction of travel.

A particularly preferred embodiment provides for the determination of the position and of the location to comprise a determination of the extent of the feature or of the feature combination in the direction of travel and perpendicular to the direction of travel in the camera image. In other words, it is not the real extent of the feature or of the feature combination in the direction of travel and perpendicular to the direction of travel that is determined, but merely the extent in the camera image. This permits a largely free determination for example of the basic state of the conveying apparatus, i.e. of a desired distance between the first conveying unit and the second conveying unit and a desired angular alignment of the two conveying units with respect to one another, from which changes are intended to be detected and possibly corrected.

In this context, provision can advantageously be made for the control apparatus to be set up to record a calibration value for the camera for the determination of the position and the location. The calibration value can be, for example, a factor which establishes a relationship between the dimensions of the feature or of the feature combination in the camera image and in reality. This can be of interest in particular if different cameras provide images of the same feature or of the same feature combination in different sizes.

It can be advantageous here if the control apparatus is set up to compare the length of the extent in the direction of travel and the length of the extent of the feature or of the feature combination perpendicular to the direction of travel to reference values. The reference values can be, for example, image data saved in the control apparatus during a referencing process. This involves using the camera that is arranged in the first conveying unit to record an image of the feature at the second conveying unit during the starting referencing process and to save it as a reference value for example in the control apparatus. Alternatively or additionally, image data serving as the reference value can be stored in the control apparatus. In this way, it is possible to load the image data, which have been recorded once and are to be assigned to the second conveying unit, onto two different first conveying units, which can thus cooperate with the second conveying unit. It is not absolutely necessary for image data to be used as reference values. Alternatively, it is also possible for only the feature values or feature combination values associated with the image data to be saved or stored.

An advantageous embodiment makes provision for the control apparatus to be set up for determining the position of the two conveying units with respect to one another comprises determination of the distance of the two conveying units with respect to one another, a relative position of the two conveying units along a direction of conveyance or/and an angle for example of longitudinal extents of the conveying units.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

The invention will now be explained in more detail with reference to the drawings, in which:

FIGS. 3A, 3B show a schematic top view of the conveying apparatus of FIG. 1 in a state of the two conveying units in which they are displaced in parallel fashion, and an associated camera image;

FIGS. 4A, 4B show a schematic top view of the conveying apparatus of FIG. 1 in a state having a reduced distance between the two conveying units, and an associated camera image;

FIGS. 6A, 6B show a schematic top view of the conveying apparatus of FIG. 1 in a state having a changed alignment of the two conveying units, and an associated camera image;

FIGS. 7A, 7B show a schematic top view of a conveying unit according to the invention having a projection device.

DETAILED DESCRIPTION OF THE PRESENT INVENTION

Figure 1:
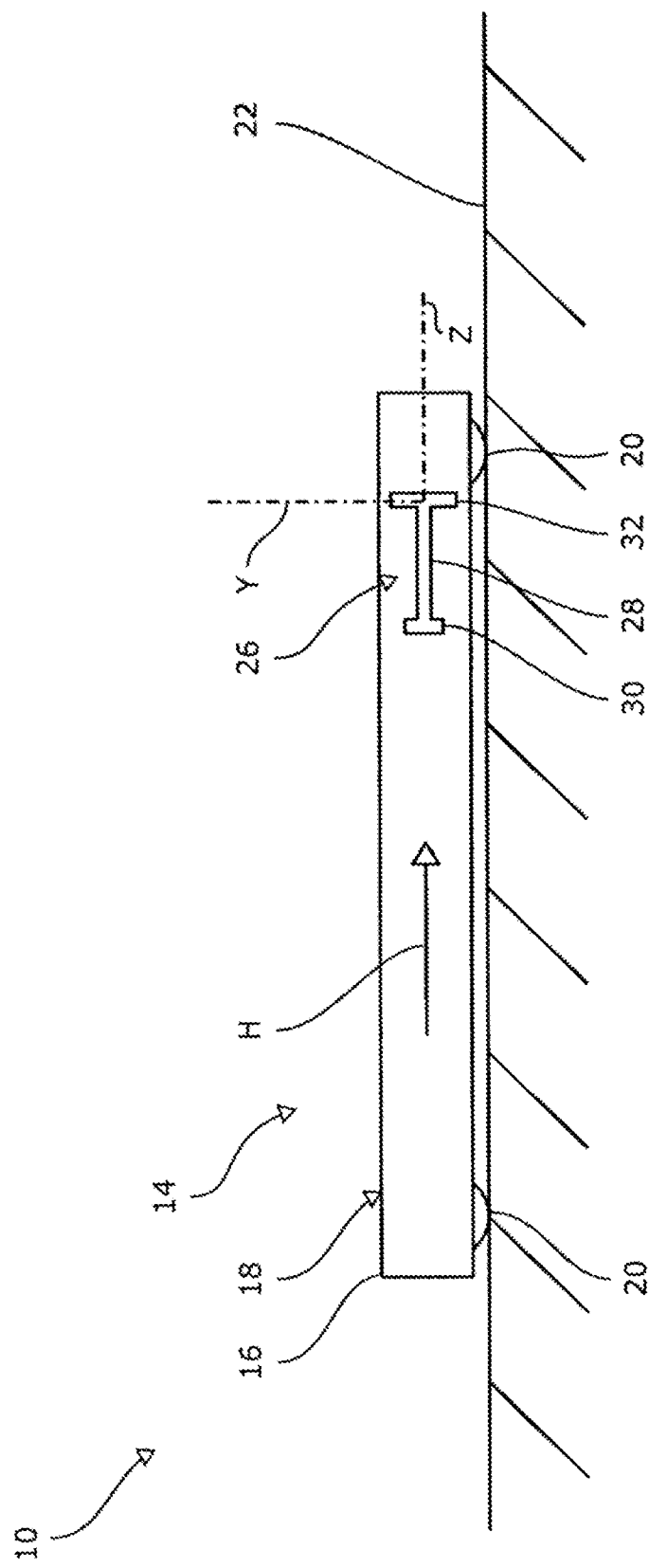
FIG. 1 shows a schematic side view of a conveying unit of an embodiment of a conveying apparatus according to the invention.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figures 2A, 2B:
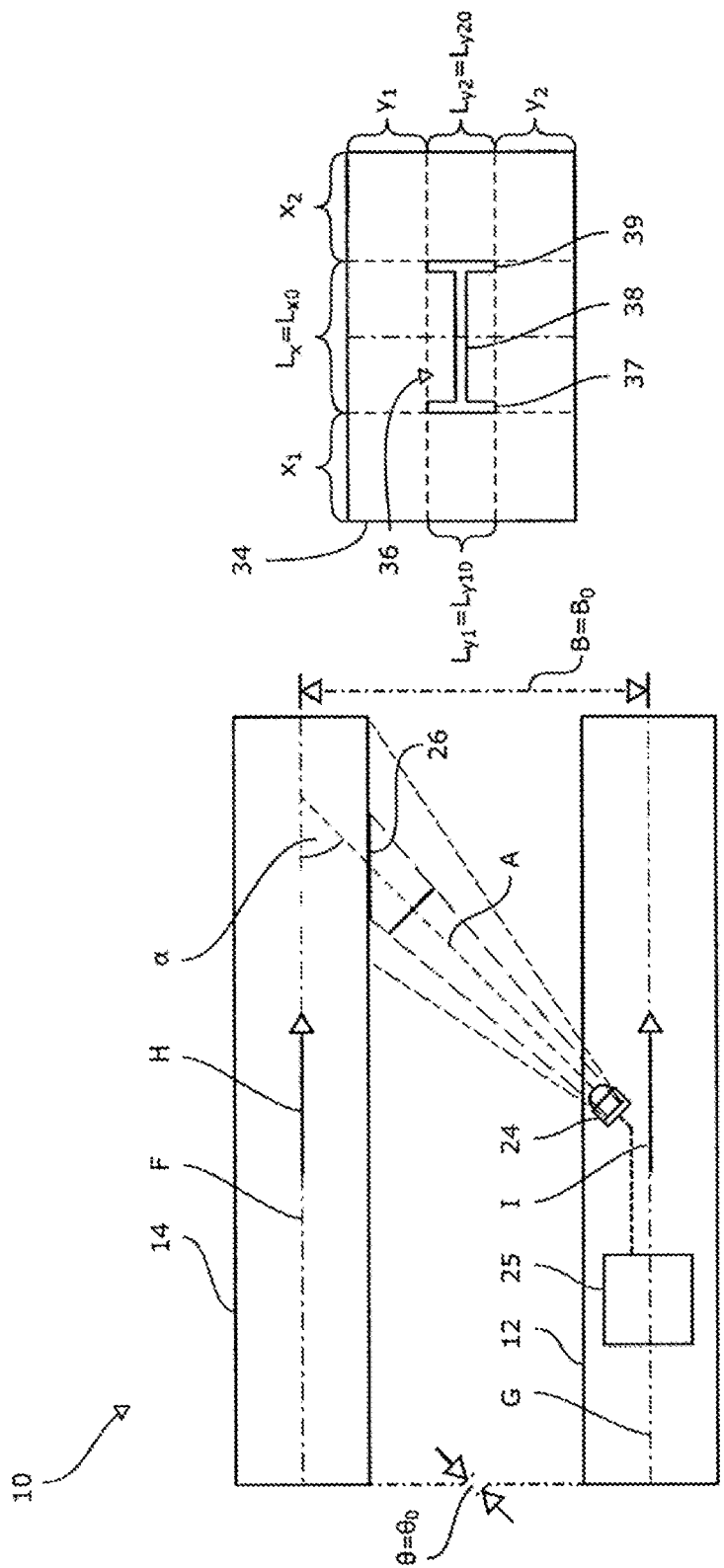
FIGS. 2A, 2B show a schematic top view of the conveying apparatus of FIG. 1 in a basic state, and an associated camera image.

FIGS. 1 and 2A show a conveying apparatus 10 having a first conveying unit 12 and a second conveying unit 14. The conveying units 12, 14 are illustrated merely schematically and can be adapted in terms of their dimensions and housing shapes to the application purpose. One possible embodiment makes provision for a configuration in the manner of conveying skids having an outer contour, for example in the form of a fork of a forklift. It is possible by way of the conveying apparatus 10 to convey laden or unladen load carriers, such as for example Euro-pallets. The conveying units 12, 14 communicate with one another and/or with a central controller (not shown), which coordinates the conveying process, in a manner known per se.

As is shown in FIGS. 1 and 2 by way of example with reference to the conveying unit 14, the conveying units 12, 14 have a housing 16 having a carrying side 18 and an undercarriage, which can be displaced on a ground 22 on ground-level rollers 20. The conveying units 12, 14 are configured such that the carrying side 18 can be raised and lowered with respect to the ground 22. If the conveying units 12, 14 adopt a lowered state, the conveying apparatus 10 is in an empty configuration and can maneuver to below a load carrier. Once below a load carrier, the conveying apparatus 10 can raise the carrying sides 18 of the conveying units 12, 14 and thus pick up the load carrier, convey it and set it down again.

As shown in FIG. 2A, the two conveying units 12, 14 in each case have longitudinal axes F, G in the directions of travel H, I. In the case of a rectilinear continuous movement of the conveying units 12, 14, the longitudinal axes F, G coincide with the respective directions of travel H, I of the conveying units 12, 14. The conveying units 12, 14 of the conveying apparatus 10 in the present case are equipped with a device for determining the position and the location of the first conveying unit 12 relative to the second conveying unit 14. The device comprises a camera 24 at the first conveying unit 12 and a feature 26 at the second conveying unit 14.

The feature 26 at the second conveying unit 14 for example consists of an H-shaped basic shape and has a section 28 in the direction of travel H, a shorter section 30 perpendicular to the direction of travel H, and a longer section 32, likewise perpendicular to the direction of travel H. The section 28 in the direction of travel H extends along an axis Z, the sections 30, 32 perpendicular to the direction of travel H extend parallel to an axis Y. In the illustrated embodiment of the conveying apparatus 10, the feature 26 is arranged in the vicinity of an end of the second conveying unit 14.

As can be seen in FIG. 2A, the first conveying unit 12 has a camera 24, which is connected to a control apparatus 25. The control apparatus can be arranged as shown in FIG. 2A in one of the two conveying units 12, 14, for example the first conveying unit 12. Alternatively, the control apparatus 25 can also be part of a central control apparatus (not shown). The transmission of the camera signals to a central control apparatus could be done, for example, wirelessly.

The arrangement of camera 24 and feature 26 can be, as shown in FIG. 2A, divided over a first conveying unit 12 and a second conveying unit 14, i.e. the first conveying unit 12 carries the camera 24 and the second conveying unit 14 carries the feature 26. Alternatively, each conveying unit 12, 14 can carry both a camera 24 and a feature 26. In this case, both the camera 24 and the feature 26 could be arranged on the same side of the housing 16. This would permit simultaneous use of both cameras and the respectively opposite features. However, the camera and feature could also be provided on two different sides of the housing 16 of the conveying unit. This would permit the manufacture of identical conveying units which, depending on their relative state, can sometimes function as a camera-carrying conveying unit and sometimes as a conveying unit carrying identifiers. In this way, it would also be possible to couple more than two conveying units in parallel ad hoc, as long as the corresponding control algorithms are available.

In the case of coordination of the first conveying unit 12 and the second conveying unit 14, provision may for example be made for the first conveying unit 12 to act as the determinant conveying unit and for the second conveying unit 14 to be subject to the first one, and for the traveling behavior of the second conveying unit 14 to be specified by the first conveying unit 12.

The camera 24 in the embodiment 10 shown is attached approximately centrally at the first conveying unit 12 and aligned with the feature 26 of the second conveying unit 14 such that a camera axis A, which represents the optical axis of the camera 24, encloses an angle α of approximately 45° with the axis Z. Both the arrangement of the feature 26 at the second conveying unit 14 and that of the camera 24 at the first conveying unit 12 are dependent on the respective type of use and configuration of the conveying apparatus 10. By way of example, the feature 26 can be arranged centrally, and the camera 24 can be arranged at an end. It is likewise feasible to arrange the camera 24 and the feature 26 centrally or at the end. To this end, the feature 26 can be integrated in the housing 16 of the second conveying unit 14 such that the angled arrangement between feature 26 and camera 24 also comes about if camera 24 and feature 26 are arranged directly opposite one another.

Furthermore, FIG. 2A defines both a distance B between the two conveying units 12, 14 in the form of the distance between the central axes F, G of the two conveying units 12, 14 and a horizontal offset θ. In the starting state shown, the distance is $B=B_0$, the horizontal offset is $θ_0=0$. It is also possible to select a reference horizontal offset $θ_0$ that is not equal to 0.

FIG. 2B shows a camera image 34 by the camera 24, as results from the arrangement shown in FIG. 2A. The camera image 34 shows an image 36 of the feature 26, as is formed on a camera sensor of the camera 34 in the starting state, shown in FIG. 2A, and is captured and possibly processed further by the control apparatus 25. The image 36 has a horizontal pixel number $P_x$ and vertical pixel numbers $P_{y1}$ and $P_{y2}$, to which an extent $L_x$ in the direction of travel H and extents $L_{y1}$ and $L_{y2}$ perpendicular to the direction of travel H can be assigned. The extent $L_x$ in the direction of travel H here substantially corresponds to the length of the section 28 of the feature 26, as shown in FIG. 1. In the image 36 shown in FIG. 2B, this section is identified as a horizontal section 38. The extent $L_{y1}$ perpendicular to the direction of travel corresponds to the length of the section 30 of the feature 26 (see FIG. 1) and is identified in the image 36 as the section 37. The extent $L_{y2}$ corresponds to the length of the section 32 of the feature 26 (see FIG. 1) and is identified in the image 36 as the section 39. What can be seen here is that the different lengths of the sections 30, 32 of the feature 26 transform into identical lengths of the sections 37, 38 of the image 36. The presence of identical lengths in the sections 37, 39 of the image 36 is not necessary, however, but merely illustrates the transformation process.

The image 36 is located within the camera image 34 at a position that can be defined by the distances $x_1$, $x_2$, $y_1$ and $y_2$.

The starting state shown in FIG. 2A gives the reference or control image 34 shown in FIG. 2B, which can be characterized by way of the following relationships:

$$P_x \to L_x; P_y \to L_y$$

$$y_1 = y_2; x_1 = x_2$$

$$L_{y10} = L_{y20}$$

$$L_{x0} = 2L_{y10} = 2L_{y20} \Rightarrow Q_0 := \frac{L_{x0}}{L_{y10}} = \frac{L_{x0}}{L_{y20}} = 2$$

The relation $L_{x0}=2L_{y10}=2L_{y20}$ in FIG. 2B is selected randomly and should be understood to be no more than an exemplary embodiment. The selection of twice the width $L_{x0}$ of the feature compared to its heights can of course be adapted to the respective case of application and the respective conditions. The same applies to the relationship $L_{y10}=L_{y20}$, as already explained above. Neither is a central positioning in accordance with $y_1=y_2$; $x_1=x_2$ absolutely necessary in the reference image. Of course, other relationships are also possible here, the equality merely symbolizes the ideal starting state.

These values and relationships demonstrate the fact that both conveying units 12, 14 are aligned parallel with respect to one another, have an starting distance $B_0$, and a horizontal offset $\theta_0$ is equal to zero. The quotient $Q_{1/2}=L_x/L_{y1/2}$ represents a criterion for the parallelism of the two conveying units 12, 14. A deviation of one or both quotients $Q_{1/2}$ from the value $Q_0$ characterizes an angled relationship of the axes F, G of the two conveying units 12, 14 relative to one another.

FIGS. 3A and 3B show a state that differs from the starting state shown in FIG. 2A. In the state illustrated in FIG. 3A of the two conveying units 12, 14, the alignment of the two conveying units 12, 14 is again parallel, and the distance B between the two conveying units 12, 14 is again $B_0$. However, the horizontal offset $\theta$ is now not equal to the reference value $\theta_0$, in particular $\theta>0$. Such a situation can result, for example, in the case of an approaching movement of the first conveying unit 12 to the second conveying unit 14. In the camera image 34, the state of the two conveying units 12, 14 is imaged as follows: the dimension $L_x$ is unchanged: $L_x=L_{x0}$. The location of the image 36, however, has changed: $x_1 \neq x_2$, in particular $x_1>x_2$. The distance B which has remained the same is shown in $L_{y1/2}=L_{y10}=L_{y20}$, the parallelism which has remained the same in $Q_{1/2}=Q_0$. It is thus possible by way of the camera 34 to determine, on the basis of a previously determined starting image or reference image, the distance between the two conveying units 12, 14 along a direction of travel H, I on the basis of a horizontal offset of the image 36. Analogously, a raising or lowering of the second moving unit 14 with respect to the first moving unit 12 could also be determined on the basis of a vertical offset of the camera image 36. Of course, any desired superpositions of the two movements mentioned can also be determined on the basis of corresponding offsets of the image 36 in the camera image 34.

In the state of the two conveying units 12, 14, shown in FIGS. 4A and 4B, a parallel alignment is again maintained, i.e. $Q_{1/2}=Q_0$. For the relative position of the two conveying units 12, 14, $\theta=\theta_0=0$. Consequently, the image 36 is without offset in the camera image 36. However, for the distance B between the two conveying units: $B \neq B_0$, in particular $B<B_0$. The distance between the two conveying units 12, 14 has thus decreased. This is demonstrated in the camera image 34 illustrated in FIG. 4B as an image 36 of the feature 26 which is enlarged in the horizontal and vertical direction: $L_x>L_{x0}$; $L_{y1}>L_{y10}; L_{y2}>L_{y20}$. It is thus possible, on the basis of the camera image, for the relative distance between the two conveying units 12, 14 to be determined as related to a previously determined starting or relative position on the basis of an undistorted enlargement of the image 36 in the camera image 34.

Figure 5B:
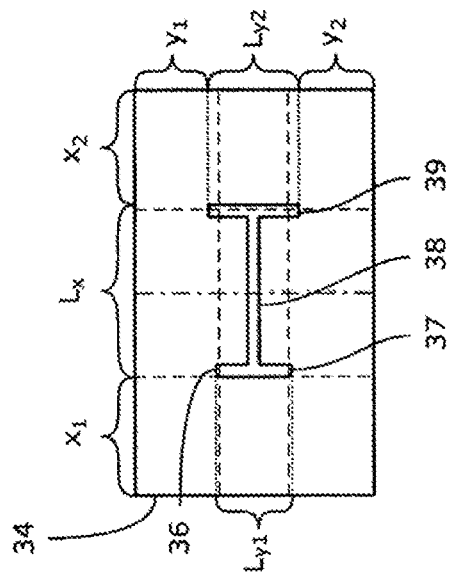
FIGS. 5A, 5B show a schematic top view of the conveying apparatus of FIG. 1 in a state having a changed alignment of the two conveying units, and an associated camera image.
Figure 5A:
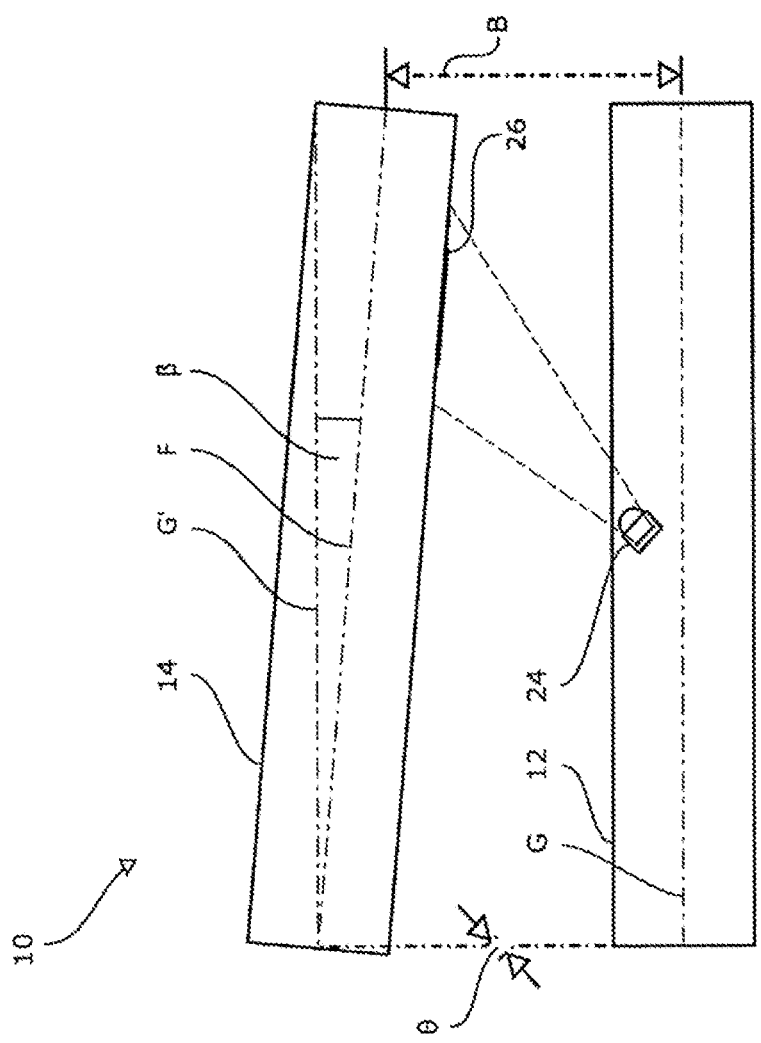

FIG. 5A shows a state of the two conveying units 12, 14, in which both an angle deviation of the two longitudinal axes F, G of the conveying units 12, 14 compared to the starting or reference state shown in FIG. 2A and also a reduction in the distance between the two conveying units 12, 14 has taken place. For illustration purposes, an angle $\beta$ between the longitudinal axis F of the second conveying unit 14 and an axis G', plotted parallel to the longitudinal axis G of the first conveying unit, is defined in FIG. 5A. The illustrated case $\beta \neq 0$, in particular here $\beta<0$, is shown in the camera image 34 by the camera 24, illustrated in FIG. 5B, as follows: $L_x>L_{x0}; L_{y1}>L_{y10}; L_{y2}>L_{y20}$. In particular, the change in the lengths $L_{y1/2}$ of the images 37, 39 of the two sections 30, 32 which are arranged perpendicular to the direction of travel H differs. Consequently, for the quotients $Q_{1/2}$: $Q_{1/2}<Q_0$. In particular, the quotient $Q_1=L_x/L_{y1}$ for the length of the section 37 of the image 36 differs from the quotient $Q_2=L_x/L_{y2}$, in which: $Q_1>Q_2$. Consequently, it is possible, on the basis of the changes in the absolute length units $L_x$, $L_{y1/2}$ of the image 36 of the feature 26, to deduce a change in the distance between the two conveying units 12, 14, and by way of the quotients $Q_{1/2}$ to deduce a possible change in the angle $\beta$, which is enclosed by the two longitudinal axes F, G of the two moving units 12, 14.

FIG. 6A shows a state of the two conveying units 12, 14 which is comparable to FIG. 5A, but here a change in the angle between the two conveying units 12, 14 with opposite signs has taken place. Here: $\beta>0$, and as a result: $L_x<L_{x0}$; $L_{y1}<L_{y10}; L_{y2}<L_{y20}$. At the same time, for the quotients $Q_{1/2}$: $Q_{1/2}>Q_0$, in particular $$Q_1 = \frac{L_x}{L_{y1}} < \frac{L_x}{L_{y2}} = Q_2.$$

Consequently, it is possible to ascertain the direction of the angle change on the basis of the changes in the length dimensions of the feature image 36.

FIGS. 7A and 7B show an embodiment of a conveying unit 112. Similar and comparable properties of the embodiment are designated by reference signs which are increased by 100. The conveying unit 112, like the previously described conveying units 12, 14, can be coupled with a further conveying unit to form a conveying apparatus. In addition to the already described properties, such as for example housing, rollers, control apparatus 125 and camera 124, the conveying unit 112 also has a projector 127. The projector 127 is designed to project a feature 216 along a projection axis C into the environment of the conveying unit 112. The projection axis C can here advantageously lie in one plane with the camera axis A. The projection can here be an imaging process for generating the feature 126 and thereby emit a beam bundle which is divergent in principle. This can also be, for example, a scanning process of an individual light point, in which the light point is guided over the surface onto which it is incident along a specified track. Alternatively, it can be a plurality of light beams which make up the feature 126 and are guided parallel with respect to one another, as is schematically illustrated in FIG. 7A.

The feature 126 is projected onto a surface 115 by way of the projector 127. The surface can be a housing of an adjacent conveying unit, i.e. a moving surface. Alternatively, the surface 115 can also be a wall, i.e. a locationally fixed surface, in relation to which the conveying unit 112 is intended to be navigated.

A change in a distance B of the conveying unit 112 from the surface 115 can have an influence on the size of the feature 126. In the case of a parallel projection, as shown in FIG. 7A, the size of the feature 126 on the surface 115 remains. In an imaging process, the feature 126 itself on the surface increases in size with increasing distance B. In addition, an increasing distance B reduces the size of the image 36 of the feature 126, as was already explained above with reference to FIGS. 4A-6B. By way of a suitable selection of the objective lens of the camera 124 and a suitable divergence of the projection, it is also possible here to ascertain from the size of the image 36, as shown in FIG. 7B, the distance B and a changed angle between the surface 115 and the conveying unit 112.

FIGS. 8A-F show different variations of the feature to be captured at the second conveying unit 14.

Figure 8A:
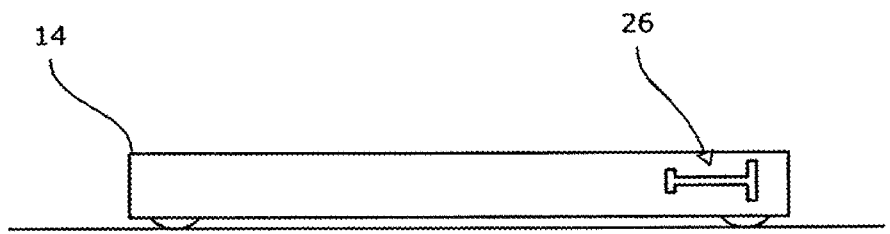
FIGS. 8A-8F show different embodiments of a feature of a conveying unit.

FIG. 8A illustrates the feature 26 already shown in FIG. 1. What has proven particularly advantageous in the configuration of the feature 24 in FIGS. 1 and 8A is the unequal height of the sections 30, 32 perpendicular to the direction of travel. The lengths of these sections are chosen such that the image 36 of the feature 26 in the case of the "ideal" starting or reference state for the two sections shows the same length perpendicular to the direction of travel.

Figure 8B:
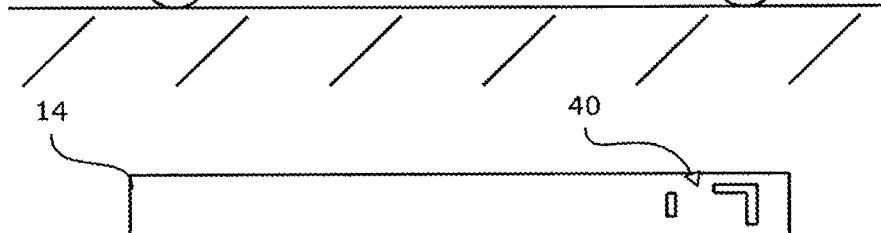
Figure 8C:
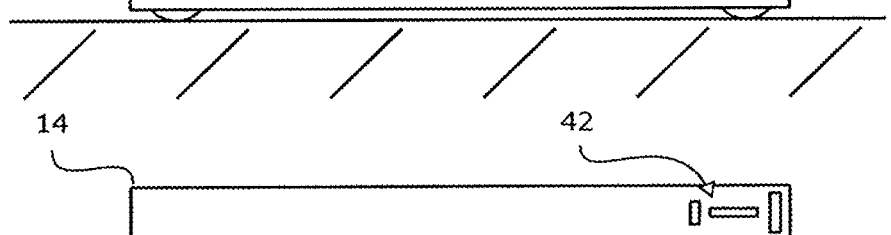

Similar features are shown in FIGS. 8B and 8C. By contrast to the feature 26 in FIG. 8A, the features in FIGS. 8B and 8C are not contiguous, but are made up of mutually separate parts and thus form a feature combination. The feature combination 40 in FIG. 8B is split in two, the feature combination 42 in FIG. 8C is split in three.

Figure 8D:
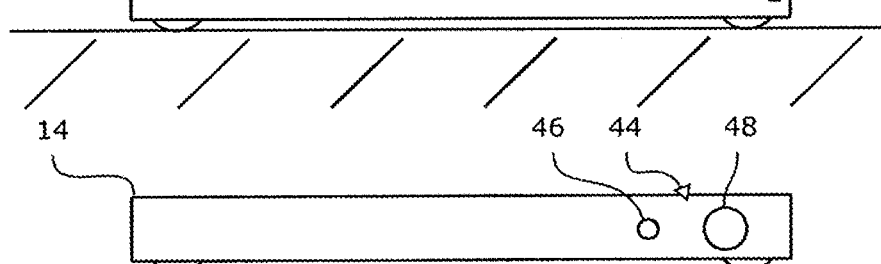
Figure 8E:
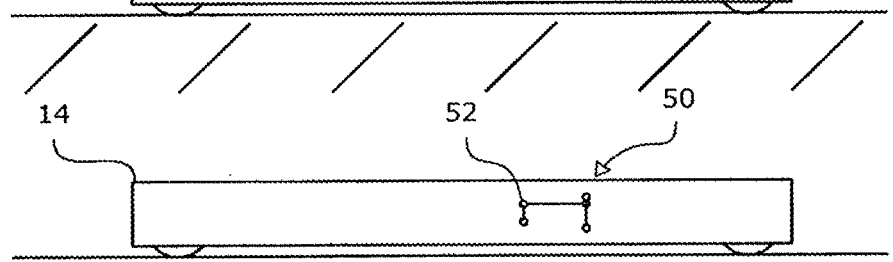

The situation is similar for the features of FIGS. 8D and 8E. Here, the feature components of the feature combinations shown are formed as circular cutouts in the housing 16 of the conveying unit 14. In FIG. 8D, the feature combination 44 provides two circular cutouts 46, 48. The extent of the feature combination perpendicular to the direction of travel is here realized by way of the diameter of the cutouts 46, 48, the extent in the direction of travel likewise by way of the diameter, but also by way of the position of the cutouts 46, 48. By contrast, in FIG. 8E, the extents of the feature combination 50 in the direction of travel and perpendicular to the direction of travel are determined exclusively by way of the position of cutouts 52, which can be designed for example as holes.

Figure 8F:
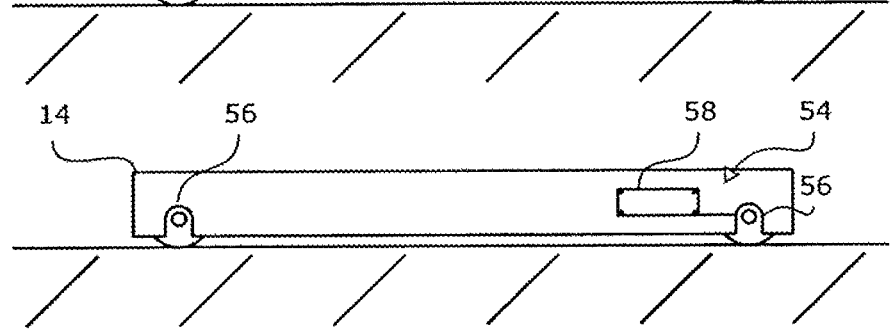

In the embodiment shown in FIG. 8F, features of the housing which are already present in any case, such as for example a wheel cutout 56 or/and a servicing access 58, are used as feature combination 54.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A conveying unit for a conveying apparatus for conveying laden or unladen load carriers comprising:
    a) a carrying side;
    b) ground-level rollers disposed opposite the carrying side so that the conveying unit is displaceable along a direction of travel,
    c) a camera for capturing an image of a feature provided on a surface or of a feature combination, wherein the feature or the feature combination has an extent in the direction of travel and an extent perpendicular to the direction of travel, and the extents are capturable by the camera,
    wherein the conveying unit has a projection device for projecting the feature or the feature combination from the conveying unit onto the surface.

2. The conveying unit as claimed in claim 1, wherein the conveying unit is set up to ascertain at least a distance of the conveying unit and an angle between the conveying unit and the extent of the feature in the direction of travel on the basis of the captured image.

3. A conveying apparatus for conveying laden or unladen load carriers comprising:
    a) a first conveying unit and a second conveying unit, wherein each conveying unit is displaceable on ground-level rollers, and the first conveying unit and the second conveying unit are movable relative to one another and independently of one another along a respective direction of travel,
    b) a device for determining the position and the location of the first conveying unit relative to the second conveying unit, having
        i) a camera arranged at the first conveying unit,
        ii) a feature arranged at the second conveying unit or a feature combination arranged at the second conveying unit, wherein the feature or the feature combination has an extent in the direction of travel and an extent perpendicular to the direction of travel, wherein the extents are capturable by the camera.

4. The conveying apparatus as claimed in claim 3, wherein the camera and the feature or the feature combination are arranged at the first conveying unit and the second conveying unit in a manner such that a camera axis is aligned with the feature or the feature combination, and the camera axis encloses an angle that is not equal to 90 with the extent in the direction of travel of the feature or of the feature combination.

5. The conveying apparatus as claimed in claim 4, wherein the angle is between 70° and 20°.

6. The conveying apparatus as claimed in claim 4, wherein the angle is 45°±15°.

7. The conveying apparatus as claimed in claim 3, wherein the feature or the feature combination is structural and/or placed by adhesive bonding and/or painted on.

8. The conveying apparatus as claimed in claim 3, wherein the feature or the feature combination comprises cutouts, elevations or/and edges.

9. The conveying apparatus as claimed in claim 8, wherein the cutouts comprise holes or/and grooves.

10. The conveying apparatus as claimed in claim 3, wherein the feature or the feature combination at least partially consists of light.

11. The conveying apparatus as claimed in claim 3 having a control apparatus which is set up to capture the length of the extents of the feature or of the feature combination for determining the position and the location of the first conveying unit relative to the second conveying unit.

12. The conveying apparatus as claimed in claim 11, wherein determining the position and the location comprises determining the extents of the feature or of the feature combination in a camera image.

13. The conveying apparatus as claimed in claim 11, wherein the control apparatus is set up to record a calibration value for the camera for determining the position and the location.

14. The conveying apparatus as claimed in claim 11, wherein the control apparatus is set up to compare the length of the extent in the direction of travel and the length of the extent perpendicular to the direction of travel of the feature or of the feature combination to reference values.

15. The conveying apparatus as claimed in claim 11, wherein the control apparatus is set up for determining the position of the two conveying units with respect to one another comprises determination of the distance of the two conveying units with respect to one another, a relative position of the two conveying units along a direction of conveyance or/and an angle of the conveying units.

16. The conveying apparatus as claimed in claim 3 wherein the first conveying unit and the second conveying unit each comprises a carrying side located opposite the ground rollers, the carrying unit of the first conveying unit and the carrying side of the second conveying unit being used to jointly carry a single laden or unladen load carrier.

17. A method of controlling conveying units in a conveying apparatus comprising the steps of:
providing a feature or feature combination on a first conveying unit;
providing a camera on a second conveying unit;
angling the camera on the second conveying unit to capture the feature or feature combination on the second conveying unit;
setting a reference point based on an initial capturing of the feature or feature combination by the camera;
moving one or more of the first conveying unit or the second conveying unit; and
determining a distance between the first conveying unit relative to the second conveying unit, and an angle of travel between the first conveying unit relative to the second conveying unit, after movement has begun based on the reference point and continued capture of the feature or feature combination by the camera.

* * * * *